F. A. Hunt,
Washing Machine,
No. 51,185. Patented Nov. 28, 1865.
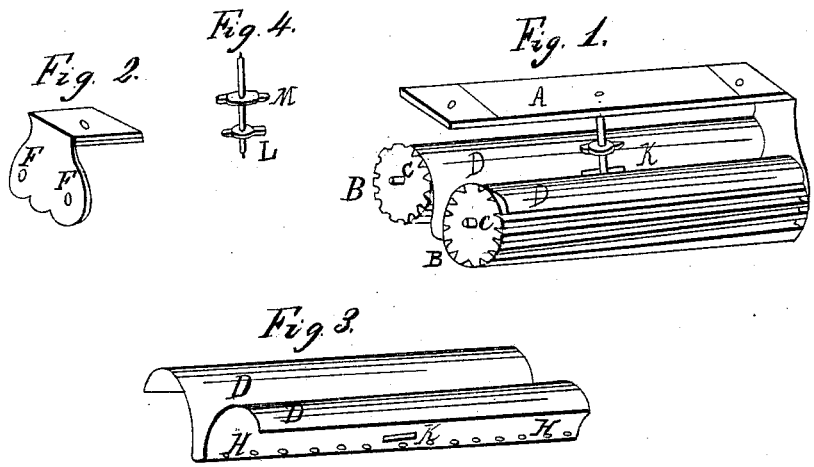
Witnesses:
W. G. Sterling
Edward Van De Zwark
Inventor:
F. A. Hunt

UNITED STATES PATENT OFFICE.

F. A. HUNT, OF NEW YORK, N. Y.

WASHING-MACHINE.

Specification forming part of Letters Patent No. 51,185, dated November 28, 1865.

*To all whom it may concern:*

Be it known that I, F. A. HUNT, of the city of New York, county and State of New York, have invented certain Improvements in a Washing-Machine, which was never before known or used; and the following is a full and exact description of the invention, reference being had to the drawings annexed, which form a part of this specifiation.

Figure 1 represents the machine with one of the end standards removed, as shown in Fig. 2. Fig. 3 is a detached trough. Fig. 4 is the key, all of which will be hereinafter described.

The fluted rollers are about ten inches long and one and one-half inch in diameter, and turn on end pins, (shown at C C, Fig. 1.) The standards are firmly secured in their places by being attached to the ends of the handle and the trough. The rollers are so adjusted as to rotate freely when the machine is moved on the surface of an ordinary slotted or corrugated wash-board.

D D, Figs. 1 and 3, represent the trough. It is filled with water when the machine is run down into the tub, and the water is discharged when brought up through the bottom holes.

H H, Fig. 4, is the key. M is the disk or handle by which it is turned. L is a cross-bar, which passes through the slot K, Figs. 1 and 3, when it is turned crosswise and enters between the cogs in the fluted rollers and prevents their revolving, so that it can be used either as a rolling or rubbing machine, as the articles to be washed require.

I claim—

The perforated trough D D, in combination with the fluted rollers C C, as and for the purpose specified.

F. A. HUNT.

Witnesses:
   W. G. STEELING,
   E. VAN DE MARK.